United States Patent [19]

Klingel et al.

[11] Patent Number: 4,940,880
[45] Date of Patent: Jul. 10, 1990

[54] COMBINATION PUNCH PRESS AND LASER CUTTING MACHINE WITH LASER BEAM GENERATOR MOUNTED THEREON

[75] Inventors: Hans Klingel, Moeglingen; Juergen Doettling, Ditzingen, both of Fed. Rep. of Germany

[73] Assignee: Trumpf GmbH & Co., Ditzingen, Fed. Rep. of Germany

[21] Appl. No.: 405,476

[22] Filed: Sep. 11, 1989

[51] Int. Cl.$^5$ ............................................. B23K 26/00
[52] U.S. Cl. ......................... 219/121.67; 219/121.82; 219/121.84
[58] Field of Search ........... 219/121.6, 121.67, 121.72, 219/121.7, 121.71, 121.82, 121.84, 121.85

[56] References Cited

U.S. PATENT DOCUMENTS

4,335,296 6/1982 Bredow ...................... 219/121.82 X

Primary Examiner—C. L. Albritton

[57] ABSTRACT

A combination punch press and laser cutting machine has a C-shaped frame with a platform extending rearwardly from the web of the frame. Supported on the platform is a laser beam generator with vibration isolating fluid mounting elements disposed therebetween to support the generator on a fluid medium during operation as a punching machine. A laser beam transport system extends forwardly along the side of the frame and has a beam redirection component to effect angular and planar reorientation of the beam at the front of the frame. A cutting head is mounted on the front of the head of the frame and has a nozzle and internal optics to focus the beam through the nozzle onto the workpiece, and the cutting head is movable from an operative position in which the nozzle is located on the axis of reciprocation of the punch ram to an inoperative position in which it is spaced therefrom.

33 Claims, 8 Drawing Sheets

COMBINATION PUNCH PRESS AND LASER CUTTING MACHINE WITH LASER BEAM GENERATOR MOUNTED THEREON

BACKGROUND OF THE INVENTION

The present invention relates to combination punch press and laser cutting machines and more particularly to an improved assembly for mounting the laser beam generator on the punch press frame and for delivering the laser beam to the nozzle of the cutting head located on the axis of reciprocation of the ram.

Combination punch press and thermal cutting machines have enjoyed substantial acceptance in providing a high degree of versatility in sheet metal processing since the user may readily punch or nibble small holes and thermally cut larger ones on the container of the finished workpiece. Although plasma cutting had been favored for cost and speed considerations, particularly in some industrial environments, development of improved, relatively low cost high powered lasers has led to wider usage of laser cutting.

Clark et al U.S. Pat. No. Re. 31,042 discloses that it is necessary to space the laser beam generator from the punch press machine in order to isolate it from the punch press vibrations, and also to provide a second work station operation which is offset from the punching station. Klingel U.S. Pat. No. 4,698,480 discloses the advantages to, and an apparatus for, placing the laser beam cutting head at the punching station so that there is a single work station about which the workpiece is moved and suggesting supporting the laser beam generator on the punch press frame. Recently, Amada German Offenlegungsschrift No. DE 3814630 A1 has proposed mounting the laser beam generator on an extension of the base of the punch press machine frame and transporting the laser beam over the head of the frame and then downwardly to the cutting head at a work station offset from the punching station.

Mounting the laser generator on or adjacent the punch press frame does present a problem from the standpoint of minimizing the possible deleterious effect of vibrations on the laser generator. It has been known to use fluid vibration absorbing or damping means under the punch press to minimize the transmission of vibrations to the underlying support for the machine base and then to other equipment in the surrounding environment. The aforementioned Amada Offenlegungsschrift utilizes such fluid absorbing damping means between the machine frame and the laser beam generator. However, both the base and the head of the frame are subject to appreciable vibrations since the base receives the impact of the punching action, and the head reacts to the impact forces delivered to the base by the ram. In C-shaped frames, the head is an elongated element supported only at its rearward end and the punching action is at its forward end so that it may oscillate during the punching operation.

It is also generally considered desirable to produce angular and planar redirection of the laser beam along its path from the generator to the cutting head to avoid polarization of the beam. Moreover, it is desirable to locate the laser beam generator and can transport systems at readily accessible and observable locations.

It is an object of the present invention to provide a novel combination punch press and laser cutting machine in which the laser beam generator is carried on a generally C-shaped punch frame at a location of relative stability and at which the generator is readily accessible and observable.

It is also an object of the invention to provide such a novel combination machine in which the laser beam is transported along the frame to the cutting head in a path which is readily accessible for observation and servicing and which also effects redirection of the beam to avoid its polarization.

Another object is to provide such a machine in which the laser cutting head is readily moved from an inoperative position offset from the punching station to an operative position in which its nozzle is coaxial therewith.

Still another object is to provide such a machine in which various operations are performed rapidly and accurately under computer control.

SUMMARY OF THE INVENTION

It has now been found that the foregoing and related objects may be readily attained in a combination punch press and laser cutting machine comprising a substantially rigid frame of generally C-shaped configuration with an elongated base, an elongated head extending in spaced relationship thereabove, and a vertically extending neck therebetween at the rearward end of the frame. The neck defines the vertical height of an open throat between the head and base, and the frame has a platform extending rearwardly from the neck and providing a horizontal surface at the neck.

A ram assembly is mounted in the head adjacent its forward end for reciprocation of a ram relative to the base to punch workpieces disposed on the base. Mounted on the forward end of the head is a laser cutting assembly including a cutting head having a nozzle at its lower end, a lens for focusing the laser beam and a mirror spaced above the nozzle for directing the laser beam into the nozzle.

A laser beam generator is mounted on the platform and has an exit aperture adjacent one side of the neck, and vibration isolating means is disposed between the platform and the laser beam generator. A laser beam transport assembly includes an elongated enclosure extending forwardly from the laser beam generator exit aperture along the side of the frame to the forward end of the head. Included at the forward end thereof is a beam redirection assembly having a series of mirrors effecting a redirection of the laser beam, in both vertical and horizontal directions and in two different planes, to a mirror in the cutting head.

In the preferred embodiment, the platform includes a rigid horizontal member on the neck providing the surface on which is disposed the laser generator, and braces extending downwardly therefrom and secured to the frame. These braces are at least predominantly secured to the neck and base of the frame. The isolating means includes means for lifting the generator above the platform and providing an isolating fluid support for the generator during punching operations. Desirably, the isolating means additionally includes positioning elements which guide and locate the generator in precise horizontal and vertical position on the platform upon inactivation of the lifting means. The transport assembly includes a flexible coupling between its rearward end and the exit aperture of the generator.

Preferably, the laser cutting head is supported on the head of the frame for movement between a position locating the nozzle coaxial with the axis of reciprocation of the ram and a position offset therefrom. Mounting and movement means mount the cutting head on the head of the frame and provide the movement thereof between the two positions. Such means provides rotation of the head about a vertical axis thereof offset from the axis of reciprocation of the ram and movement along a vertical axis when in its position rotated from the ram axis. The mounting and movement means also effects movement of the nozzle along a horizontal axis relative to the ram axis of reciprocation.

Preferably, the ram assembly includes a punch mounting portion and a position of the cutting head has a locating element thereon which seats in the punch mounting portion to locate the nozzle in precise coaxial alignment with the ram axis of reciprocation.

In its most desirable form, the machine includes tool mounting means on the ram assembly and in the base, tool carrier means carrying a multiplicity of punches and cooperating dies for mounting in the tool mounting means, and tool changer means for movement of the punches and dies between the tool carrier mean and tool mounting means. The beam redirection system has a mirror directing the laser beam upwardly and forwardly of the axis of ram reciprocation, and a second mirror directing the beam downwardly along a vertical axis parallel to the axis of ram reciprocation. The laser cutting head has a horizontally extending lower portion having the nozzle depending therefrom at its one end, a mirror disposed thereabove to direct the horizontally extending laser beam downwardly into the nozzle, and a mirror spaced towards its other end to redirect the downwardly extending laser beam horizontally to the first mentioned mirror. The horizontally extending lower portion is movable along a horizontal axis into alignment with the axis of reciprocation of the ram. There is connected to the horizontally extending portion at least one conduit for gas to be discharged through the nozzle and there is also connected to the horizontally extending portion a conduit for a fluid to cool the optics therein.

DETAILED DESCRIPTION OF PREFERRED EMBODIMENT OF THE INVENTION

Figure 1:
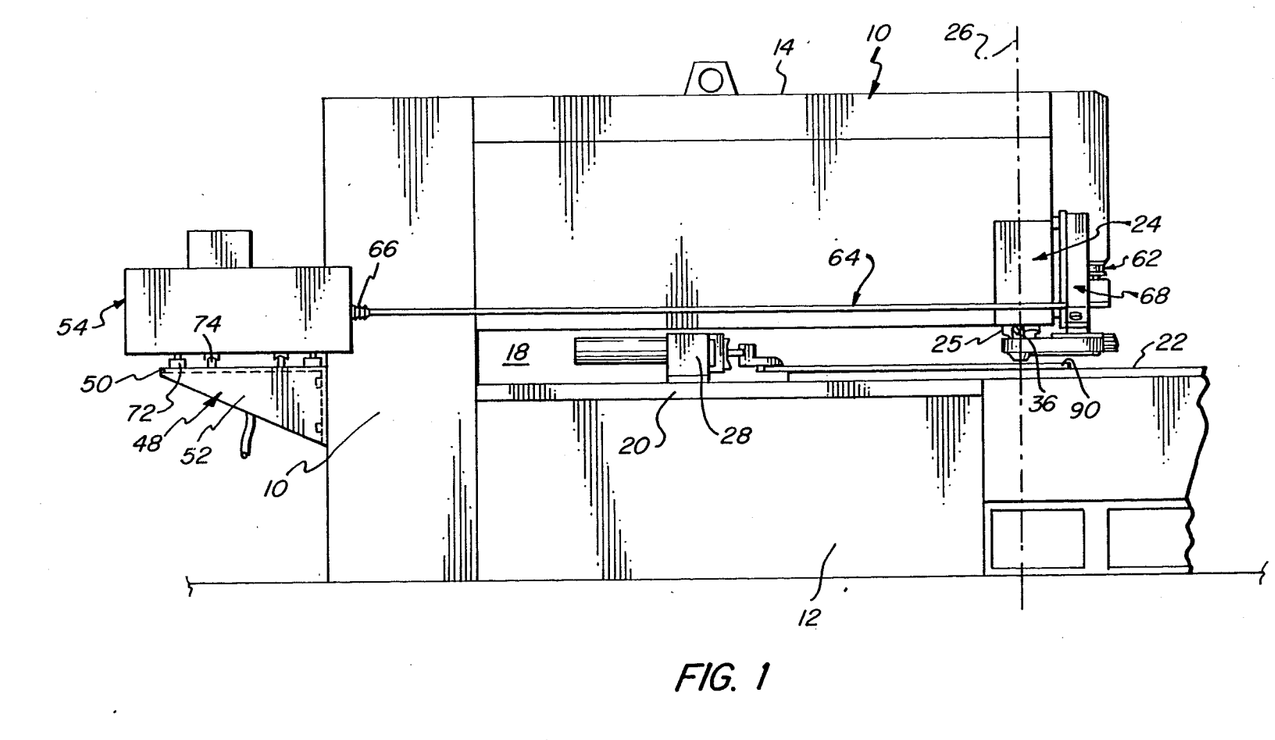
FIG. 1 is a fragmentary side elevational view of a combination punch press and laser cutting machine embodying the present invention showing the laser cutting head in operational position.
Figure 2:
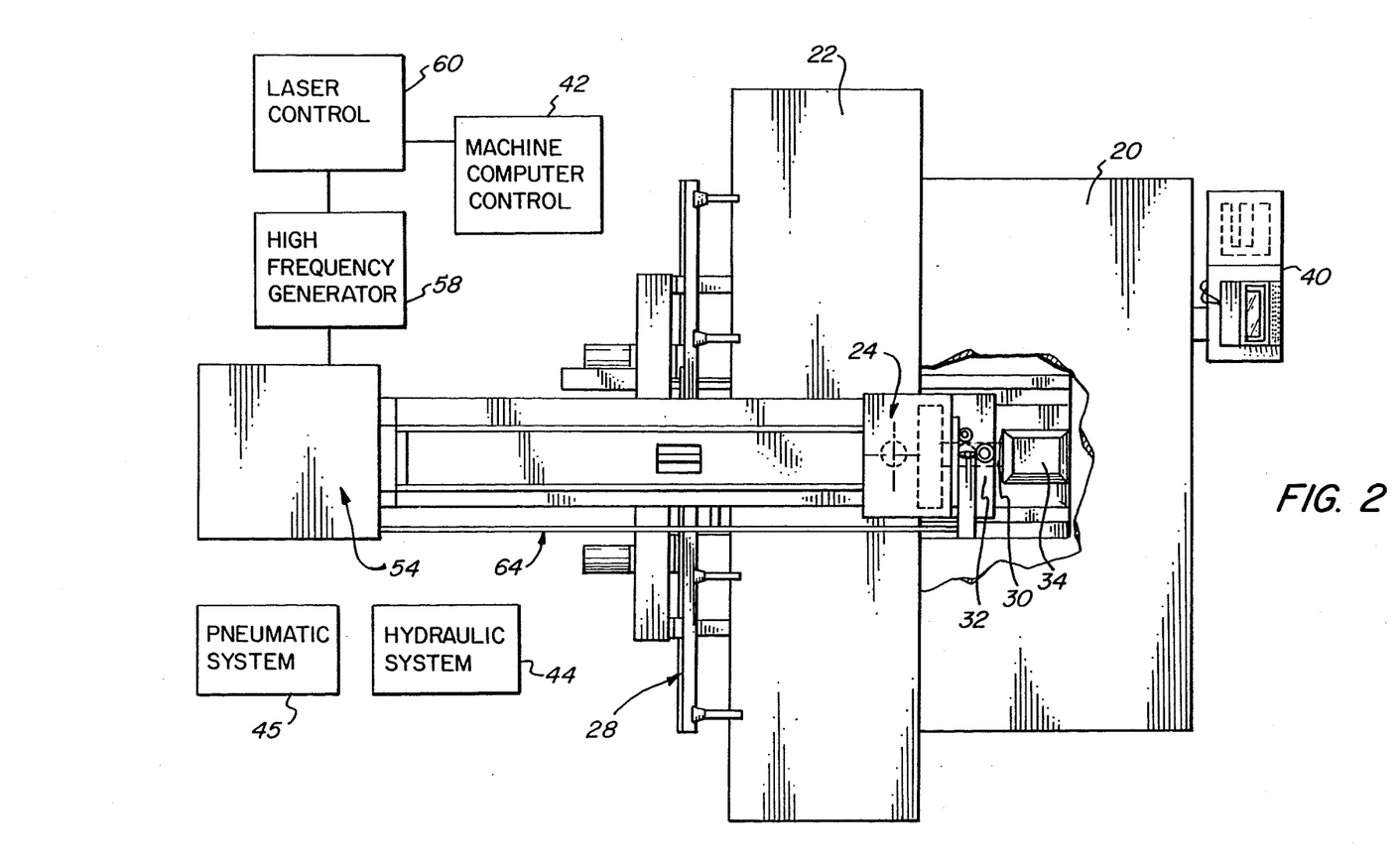
FIG. 2 is a top plan view thereof with a portion of the worktable broken away and additionally showing additional elements of the installation.

Turning first to FIGS. 1 and 2, therein illustrated is a combination punch press and laser cutting machine embodying the present invention. The machine has a rigid frame generally designated by the numeral 10 which is of generally C-shaped configuration with an elongated base 12( an elongated head 14 extending thereover in vertically spaced relationship, and a spacing web or neck 16 extending therebetween at the rearward end thereof. The web 16 defines the height of the throat 18 or spacing between the head 14 and base 12, and it also limits rearward movement of the workpiece and support and guidance systems for the workpiece (i.e., the length of the throat).

Carried on the base 12 is a worktable 20 which supports the workpiece 22, and a ram assembly generally designated by the numeral 24 is disposed at the forward end of the head 14. The axis of reciprocation is of the ram 25 is designated by the dotted line 26 and it defines the work station for the machine. The workpiece clamping and guidance system 28 is supported on the base 12 and moves the workable 20 in one direction and moves the workpiece 22 about the worktable 20.

Also mounted in the base 12 is a tool storage and changer system generally designated by the numeral 30 and of the type illustrated in Klingel U.S. Pat. No. 4,719,691. It has a circular storage member 32 rotatable about a horizontal axis, and it seats a number of punch and die sets (not shown) in recesses about its circumferences. It is movable rearwardly by the drive unit 34 to seat, or to engage and remove, punches and dies, in the tool mounting portion 32 at the base of the ram assembly 24 and die support member (not shown) in the base 12.

Also seen in FIG. 2 is a control console 40 for the computer control unit 42 and a hydraulic unit 44 which provides hydraulic fluid under pressure to reciprocate the ram 25, and to effect operation of various other elements under the control of the control unit 42. Also shown is a pneumatic unit 45 which supplies air under pressure to various other elements of the machine described hereinafter and it is also under control of the control unit 42.

As seen in FIG. 1, the frame 10 has a platform assembly generally designated by the numeral 48 which extends rearwardly thereof at its web portion 16. The platform assembly 48 includes a horizontal member 50 and struts or braces 52 which are disposed therebelow and extend to the web portion 16 and base 12. Seated on the horizontal member 50 is a laser beam generator generally designated by the numeral 54 and having a exit aperture 56 disposed to one side of the frame 10. The power to ionize a lasing gas in the generator 54 is provided by the high frequency generator 58, and the control unit therefor is designated by the numeral 60 and is also coupled to the computer control unit 42 and the console 40.

Mounted on the forward end of the head 14 of the frame 10 is a laser cutting head generally designated by the numeral 62. Extending from the exit aperture 56 of the laser generator 54 to the cutting head 62 is a beam transport assembly generally designated by the numeral 64 and including a flexible bellows portion 66 at its rearward end providing the terminal portion to the aperture 56. At its forward end is a beam redirecting system generally designated by the numeral 68 and operatively coupled to the cutting head 62.

Figure 3:
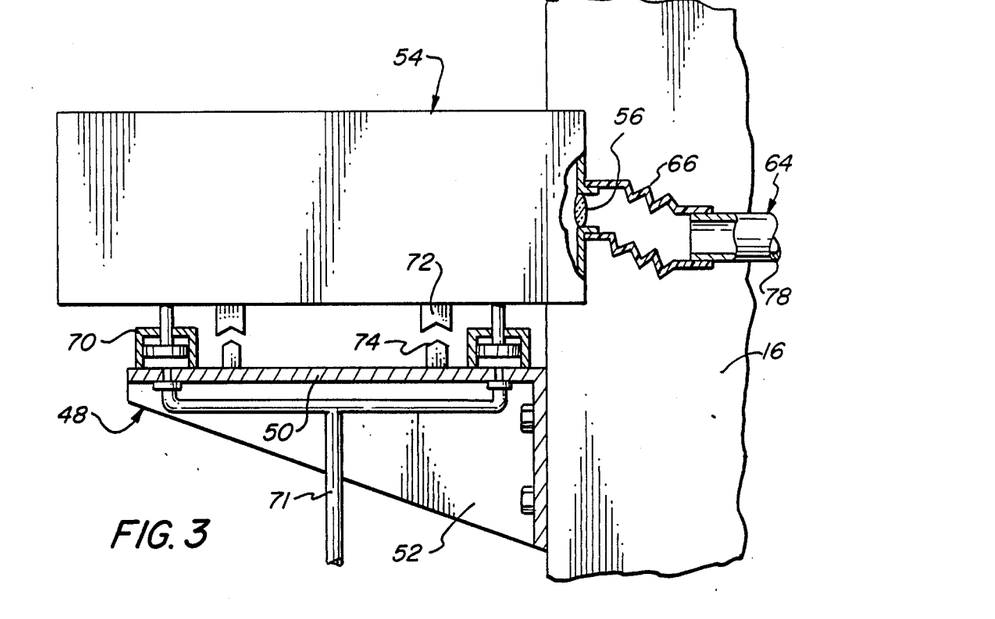
FIG. 3 is a fragmentary side elevational view of the rear end thereof drawn to an enlarged scale and with various elements in partial section.
Figure 4:
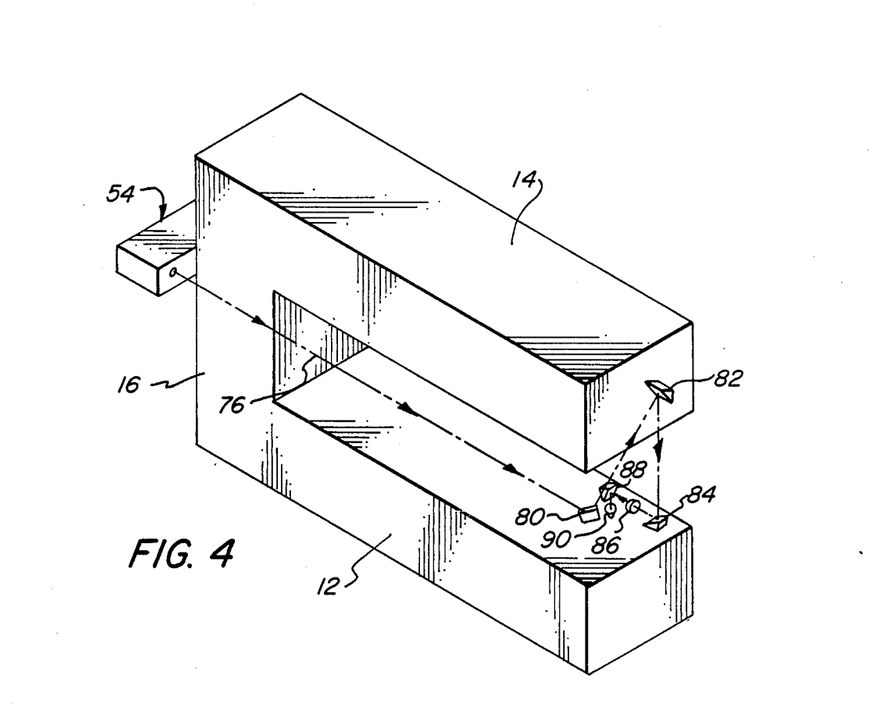
FIG. 4 is a schematic view showing the path of the laser beam from the laser beam generator to the nozzle of the cutting head.

Turning now to FIG. 3, therein illustrated are vibration isolating members 70 supporting the laser beam generator 54 on the horizontal element 50 of the platform 48. In the punching mode, air under pressure is supplied through the conduit 71 to the cylinders of the members 70 to move the pistons upwardly, and the generator 54 is thus supported on a fluid medium which damps vibrations. This operation is effected by controlling valves (not shown) to supply air from the pneumatic unit 45 by action of the control unit 42 when the machine is to perform in the punching mode. Also shown are cooperating elements 72,74 on the base of the laser beam generator 54 and platform element 50 to precisely position the laser beam generator 54 in its lowered and operative position. Upon withdrawal of the fluid from the members 70, the generator 54 descends and is positioned by the elements 72, 74. As seen in FIG. 3, the flexible portion 66 of the beam transport assembly 64 flexes to accommodate the vertical displacement of the laser beam generator 54.

As indicated in FIGS. 1-5, the laser beam 76 passes through the tube 78 of the beam transport assembly 64 to the front of the head 14 of the frame 10, and it is disposed to one side of the machine frame 10 and along its throat 18. At the forward end, it has a beam redirecting component 68 with an angularly disposed mirror 80, which has a coating thereon with a thickness equal to one fourth the wave length of the beam to change the linear polarization of the beam into a circular polarization. The mirror 80 redirects the beam at an angle of about 45° upwardly and inwardly to a mirror 82 which is located on the centerline of the head 14. This mirror 82 is angular disposed and redirects the beam at an angle of 45° downwardly to the mirror 84 in the cutting head 62. Spaced from the mirror 84 is a lens 86 which partially focuses the beam onto the surface of the mirror 88 which further focuses the beam and redirects it at an angle of 90° through the aperture in the nozzle 90 onto the workpiece 22.

Figure 5:
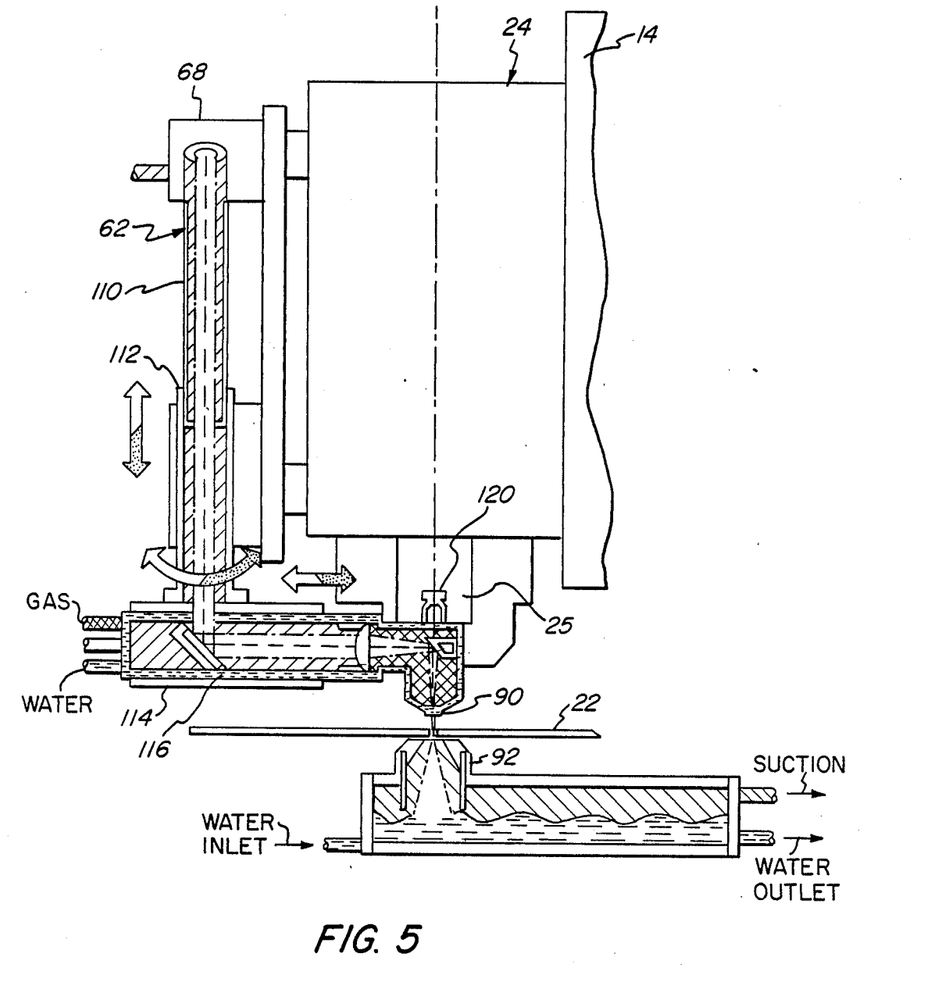
FIG. 5 is a semi-diagrammatic view of the laser cutting head at its operative position and showing the laser beam cutting a workpiece.

Below the workpiece 22 in the base 12 is a cooperating fixture 92 which has water flowing therein to cool it and carry slag away, and it is also connected a source of suction to draw away fumes generated by the thermal cutting process.

Figure 8:
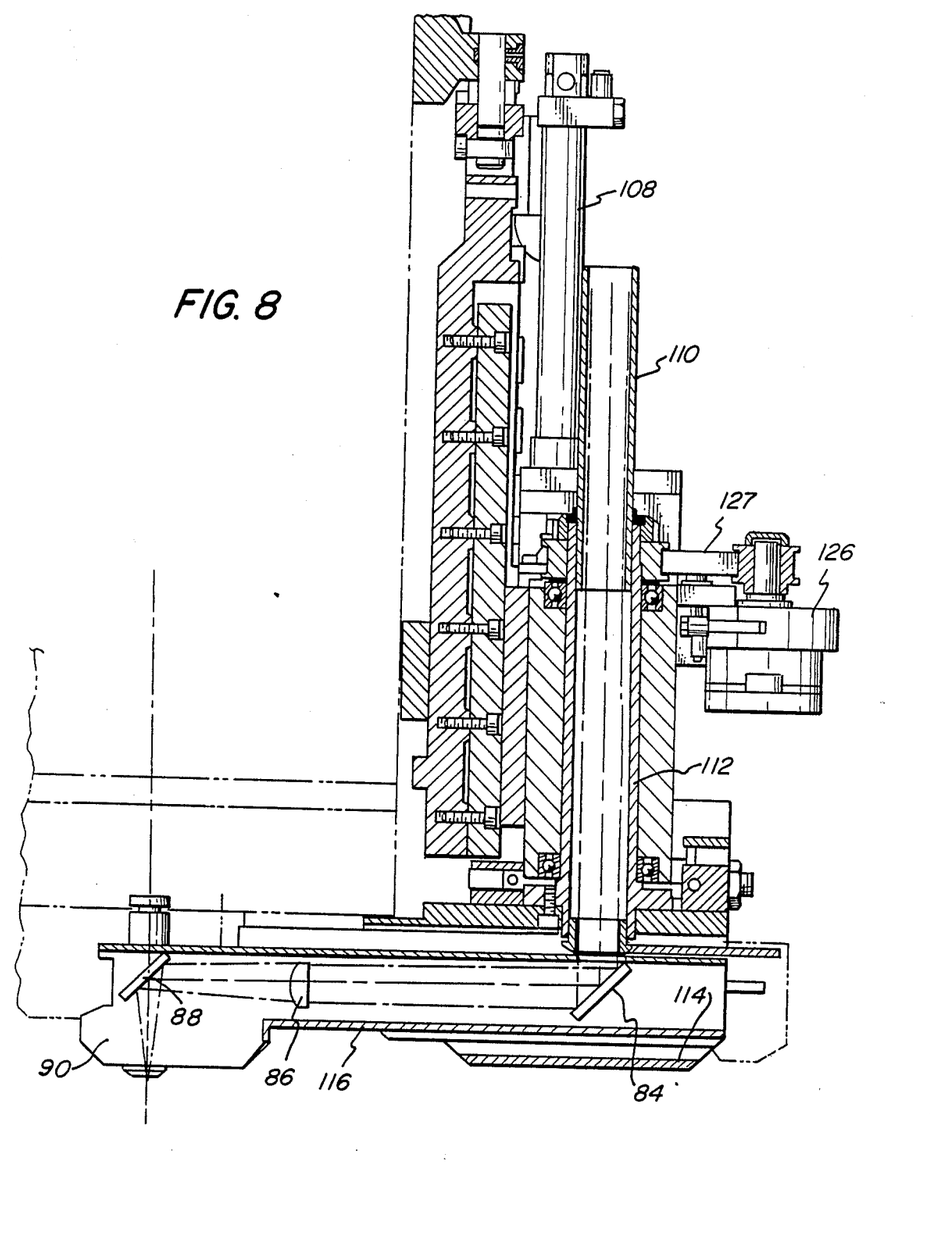
FIG. 8 is sectional view of the cutting head assembly as seen from the opposite side of the frame.

The laser cutting head 62 is seen in greater detail in FIGS. 6-12. Brackets 100 are mounted on the front face of the head 14 of the frame 10, and mounted upon them are the support bars 102 which slidably support the support frame 104 of the laser cutting head 62 (not shown in FIG. 6). Movement of the laser cutting head 62 vertically up and down is effected by action of the piston 106 in the pneumatic cylinder 108. As best seen in FIG. 8, the cutting head 62 has a telescoping vertical tubular conduit provided by a fixed section 110 and a sliding section 112 to provide an extensible enclosed vertical closed passage for the laser beam from the mirror 68 at the end of the beam transport assembly 68.

At its base, the cutting head 62 has a horizontally disposed telescoping tubular conduit provided by a fixed section 114 and the section 116 which is movable by the air actuated motor 118. On the upper surface of the movable section 116 is an upstanding boss 120 which seats in the punch mounting recess 36 at the base of the ram 25.

Figure 6:
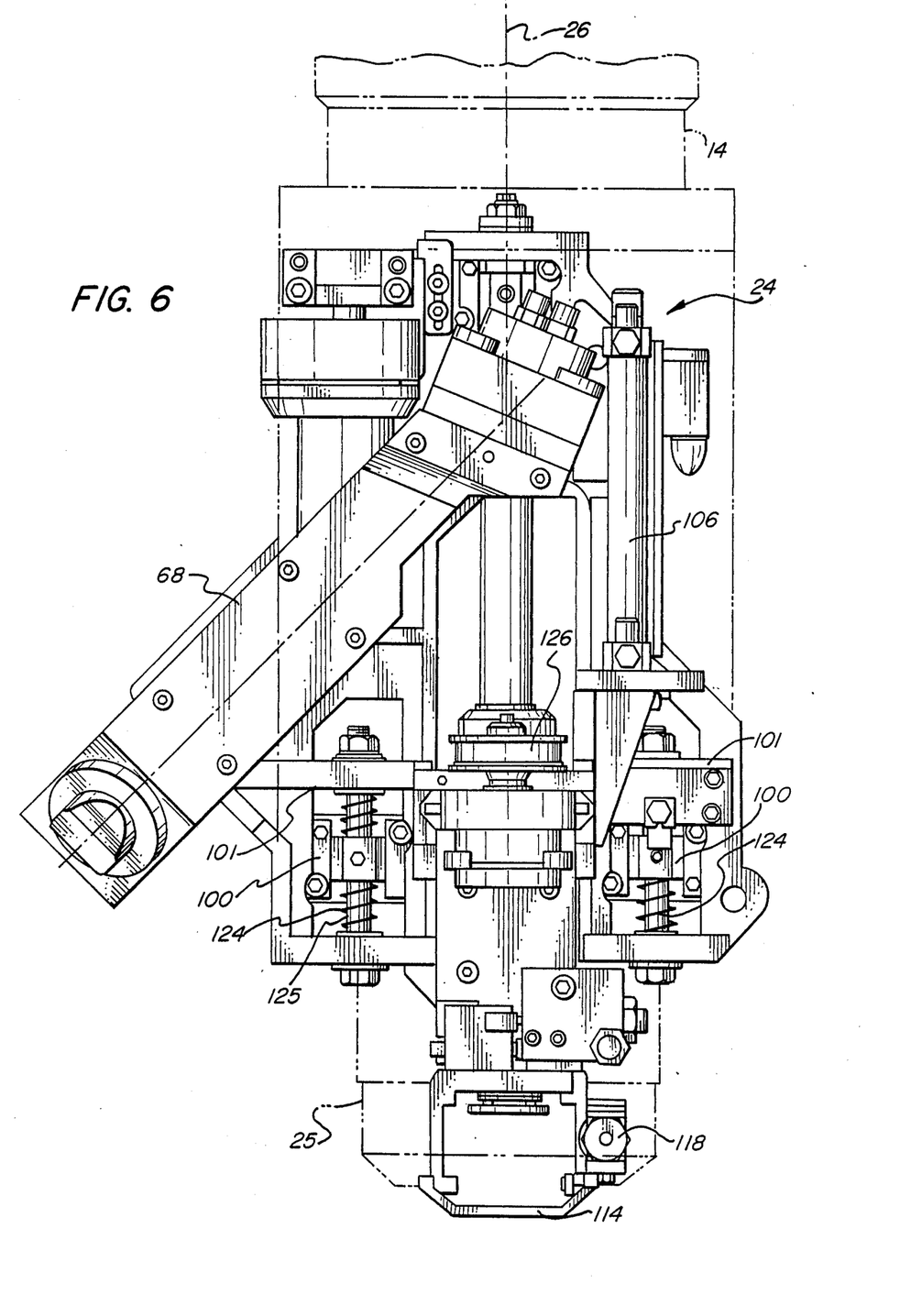
FIG. 6 is an enlarged elevational view of the front end of the frame with the cutting head removed and showing the mounting and moving means for the laser cutting head assembly in operative position and the forward end of the beam transport system.
Figure 7:
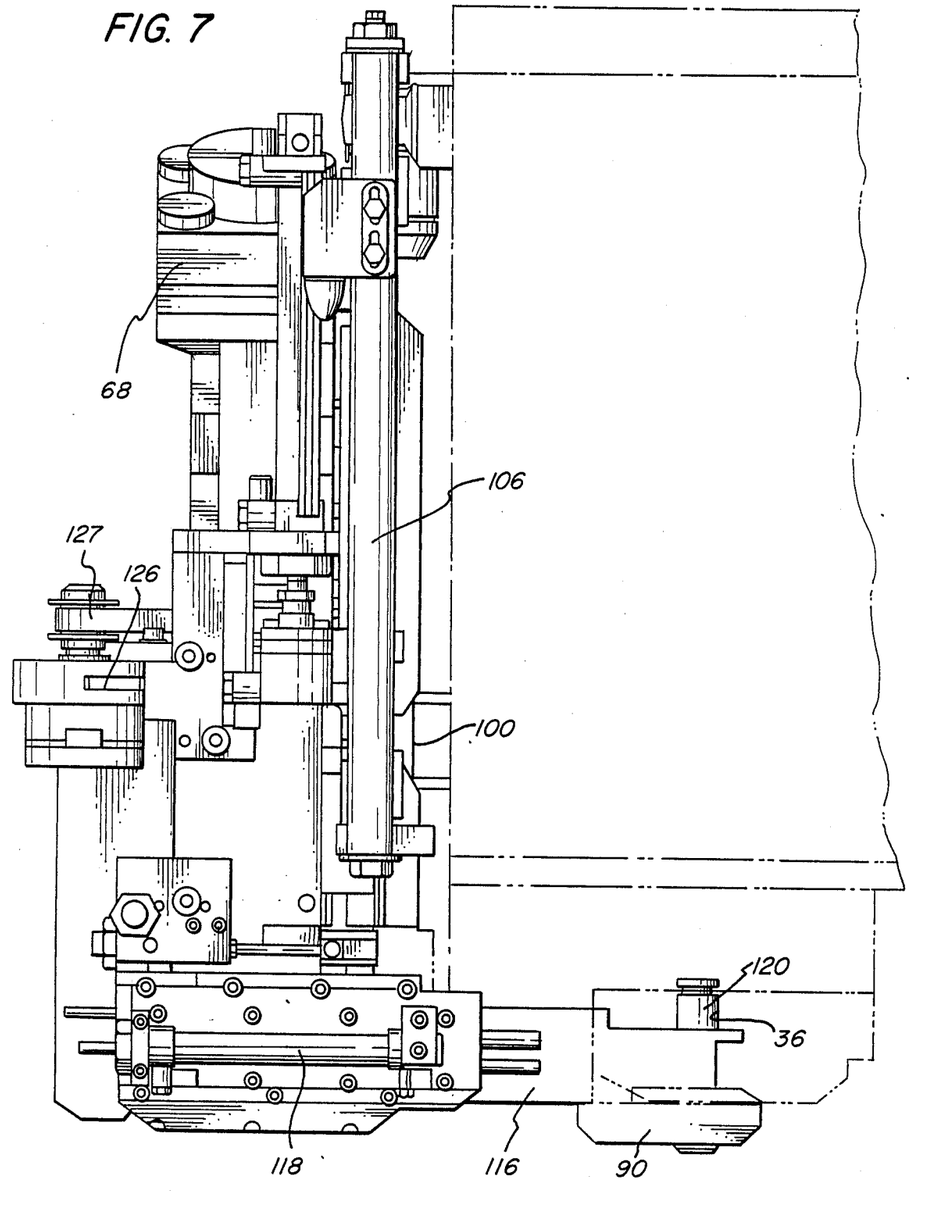
FIG. 7 is enlarged side elevational view of the elements of FIG. 6 and the cutting head, with a portion of the head of the frame and ram shown in phantom line and with the cutting head in operative position.

To dampen the effect of vibrations of the punch press upon the optics, the brackets 101 mounting the cutting head assembly are disposed on springs 124 disposed about the guide bolts 125 as seen in FIG. 6.

The cutting head 62 is also rotatable about a vertical axis by the belt drive 127 on the motor 126.

Figure 9:
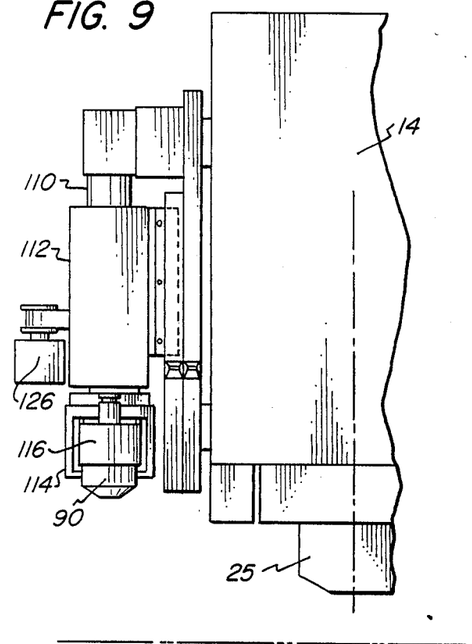
FIG. 9 is a fragmentary semi-diagrammatic view of the front of the machine showing the cutting head in its inoperative position.

Motion of the laser cutting head 62 is partially schematically illustrated in FIGS. 9-12. In FIG. 9, the cutting head 62 is disposed in its elevated, rotated and inoperative position.

Figure 10:
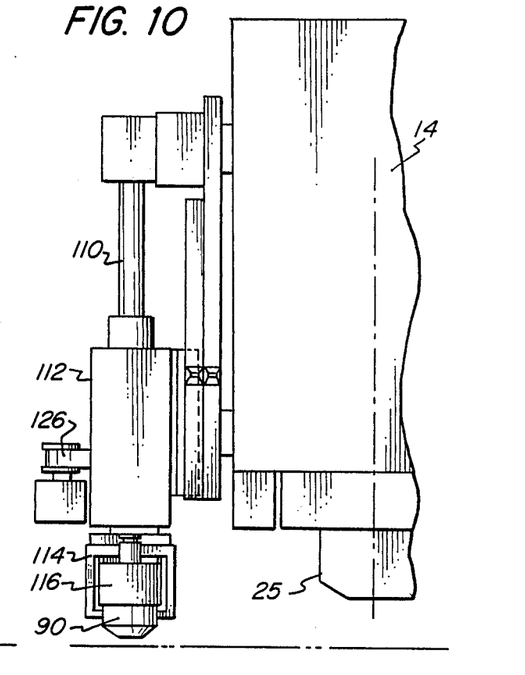
FIG. 10 is a similar view showing the cutting head moved downwardly in a first step in its movement to operative position.

Upon command from the computer control 42, the air cylinder 108 is actuated to move the cutting head 62 downwardly to the position seen in FIG. 10 at which time the cutting nozzle 90 is disposed in the horizontal plane required for its intended operation.

Figure 11:
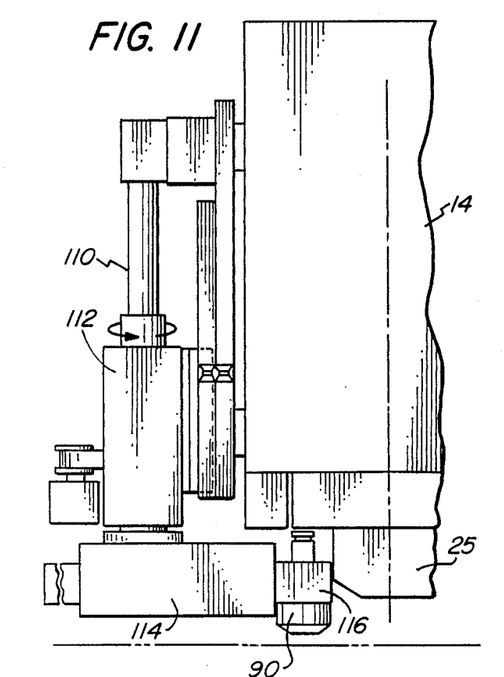
FIG. 11 is a similar view showing a portion of the cutting head rotated about its vertical axis in a second step in its movement.
Figure 12:
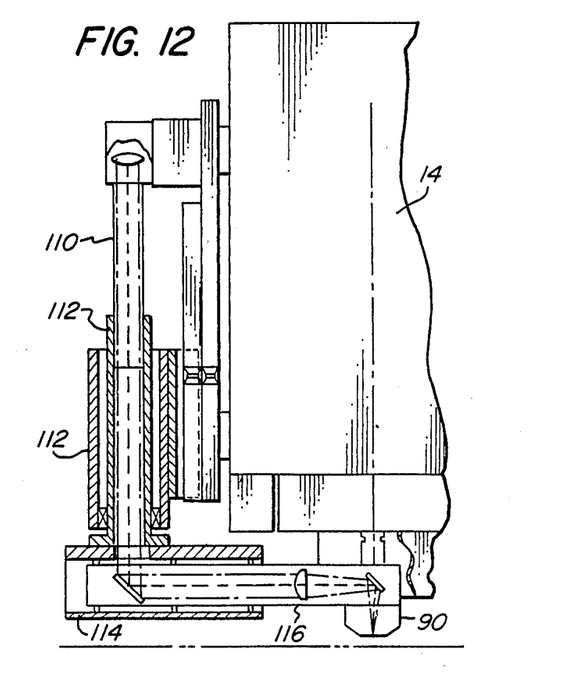
FIG. 12 is a similar view in partial section showing a portion of the cutting head extended to locate the nozzle of the cutting head and associated optics in operative position.

The motor 126 for the drive belts 27 is then actuated to rotate the cutting head 62 about the vertical axis as seen by the arrow in FIG. 11, and this pivots the nozzle 90 to a position closely adjacent the base of the ram 25. The air motor 118 is then actuated to move the telescoping section 116 to the right as seen in FIGS. 11 and 12 which causes the boss 120 to fit into the punch mounting recess 36 at the base of the ram 25, thus, bringing the nozzle 90 into coaxial alignment with the axis of ram reciprocation. Simultaneously, the mirror 84 in the telescoping tube 112 is moved into alignment with the mirror 82 in the beam redirection system 68 as shown in FIG. 12.

Thus, when the laser beam generator 54 is rendered operational and the laser beam 76 exits therefrom, it passes through the laser beam transport assembly 64 to the mirror 82 and then downwardly through the telescoping tubes 110, 12 to the mirror 84. It is then directed towards the focusing lens 86 and mirror 88 which focus the beam 76 through the aperture in the nozzle 90 and onto the workpiece 22.

By locating the laser beam generator on a platform at the central web or neck of the punch press frame, the laser beam generator is positioned at a stable portion of the frame. Unlike the head, this area is free from bending moments produced by the ram action, and the vibrations in the head and the base are materially dampened by the time that they pass into this section of the frame. Moreover, the mounting of the laser beam generator at this location permits facile servicing and observation of its operating components. It also enables transport of the laser beam along the side of the punch press through a transport assembly which is readily inspected and serviced.

By this arrangement, it is also easy to redirect the laser beam through a change in angles and planes to avoid its polarization, while minimizing the number of mirrors which must be utilized to do so. As will be readily appreciated, the mirrors in such transport assemblies in this environment are subject to damage and require precise adjustment.

By providing the mounting of the laser cutting head in a manner which permits its movement from an operative position for the laser nozzle to an inoperative position removed from the working area of the ram, the machine operator is able to observe the punching operation, and there is less likelihood of injury to elements of the laser cutting head during the punching operation.

As will be appreciated, the computer control for the machine effects the operation of the various motors and cylinders to perform the various steps required to bring components into operative position, and to perform the punching or laser cutting operations. The control console is equipped with the typical safety devices for laser operation.

As will be appreciated, the illustrated construction is one which is readily adapted to punch presses having automatic tool changers for exchanging the tools in the punch ram and in a die support located in the base. Because the laser cutting head can be moved to an inoperative position, it will not effect the typical movement of the tools from a position forwardly of the ram into the tool mounting portions.

Thus, it can be seen from the foregoing detailed specification and attached drawings that the machine of the present invention carries the laser beam generator on the punch press at a location of relative stability where it is readily accessible and observable, and it transports the laser beam therefrom to the cutting head in a path which is also readily accessible for operation and servicing, while at the same time providing simple and economical means for effecting redirection of the beam to avoid polarization. The laser cutting head is readily moved from an inoperative position offset from the punching station to an operative position in which its nozzle is coaxial therewith so as to require only one work station. Moreover, the various operations may be performed automatically and accurately under computer control.

Having described the invention, what is claimed is:

1. A combination punch press and laser cutting machine comprising:
    (a) a substantially rigid frame of generally C-shaped configuration with an elongated base, an elongated head extending in spaced relationship thereabove, and a vertically extending neck therebetween at the rearward end of the frame, said neck defining the vertical height of the open throat between the head and base, said frame having a platform extending rearwardly from said neck and providing a horizontal surface at said neck;
    (b) a ram assembly in said head adjacent its forward end for reciprocation of a ram relative to said base to punch workpieces disposed on said base, the axis of reciprocation defining the workstation;
    (c) a laser cutting assembly mounted on said forward end of said head including a cutting head having a nozzle at its lower end, a lens for focusing the laser beam exiting said nozzle, and a mirror spaced above said nozzle for directing the laser beam through said nozzle;
    (d) a laser beam generator on said platform and having an exit aperture adjacent one side of said neck;
    (e) vibration isolating means disposed between said platform and said laser beam generator; and
    (f) a laser beam transport assembly including an elongated enclosure extending forwardly from said laser beam generator exit aperture along the side of said frame to said forward end of said head and including at the forward end thereof a beam redirection assembly having a series of mirrors effecting a redirection of the laser beam, in both vertical and horizontal directions and in two different planes, to said mirror of said cutting head.

2. The combination punch press and laser cutting machine in accordance with claim 1 wherein said platform includes a rigid horizontal member on said neck providing the surface on which is disposed said laser generator and braces extending downwardly therefrom and secured to said frame.

3. The combination punch press and laser cutting machine in accordance with claim 2 wherein said braces are at least predominantly secured to said neck and base of said frame.

4. The combination punch press and laser cutting machine in accordance with claim 1 wherein said isolating means includes means for lifting said generator above said platform and providing an isolating fluid support for said generator during punching operation.

5. The combination punch press and laser cutting machine in accordance with claim 4 wherein said isolating means additionally includes positioning elements which guide and locate the generator in precise horizontal and vertical position on said platform upon inactivation of said lifting means.

6. The combination punch press and laser cutting machine in accordance with claim 4 wherein said transport assembly includes a flexible coupling between its rearward end and said exit aperture of said generator.

7. The combination punch press and laser cutting machine in accordance with claim 1 wherein said laser cutting head is supported on said head of said frame for movement between a position locating said nozzle coaxial with the axis of reciprocation of said ram and a position offset therefrom.

8. The combination punch press and laser cutting machine in accordance with claim 7 wherein there is included mounting and movement means mounting said cutting head on said head of said frame and providing said movement thereof between said positions, said means providing rotation thereof about a vertical axis offset from said axis of reciprocation of said ram and movement along a vertical axis when said nozzle is in a position rotated from said ram axis.

9. The combination punch press and laser cutting machine in accordance with claim 8 wherein said mounting and movement means also effects movement of the nozzle along a horizontal axis towards said ram axis of reciprocation.

10. The combination punch press and laser cutting machine in accordance with claim 7 wherein said ram assembly includes a punch mounting portion and said cutting head has a locating element thereon which seats in said punch mounting portion to locate said nozzle in precise coaxial alignment with said ram axis of reciprocation.

11. The combination punch press and laser cutting machine in accordance with claim 1 wherein there are included tool mounting means on said ram assembly and in said base, tool carrier means carrying a multiplicity of punches and cooperating dies for mounting in said tool mounting means, and tool changer means for movement of said punches and dies between said tool carrier means and tool mounting means.

12. The combination punch press and laser cutting machine in accordance with claim 11 wherein said laser cutting head is supported on said head of said frame for movement between a position locating said nozzle coaxial with the axis of reciprocation of said ram and a position offset therefrom.

13. The combination punch press and laser cutting machine in accordance with claim 12 wherein there is included mounting and movement means mounting said cutting head on said head of said frame and providing said movement between said positions, said means providing rotation thereof about a vertical axis offset from said axis of reciprocation of said ram and movement along a vertical axis when said nozzle is in a position rotated from said ram axis.

14. The combination punch press and laser cutting machine in accordance with claim 13 wherein said mounting and movement means also effects movement of said nozzle along a horizontal axis towards said ram axis of reciprocation.

15. The combination punch press and laser cutting machine in accordance with claim 12 wherein said ram assembly includes a punch mounting portion and said cutting head has a locating element thereon which seats in said punch mounting portion to locate said cutting head in precise coaxial alignment with said ram axis of reciprocation.

16. The combination punch press and laser cutting machine in accordance with claim 1 wherein said beam redirection system has a mirror directing the laser beam upwardly and inwardly to a point forwardly of the axis of ram reciprocation, and a second mirror directing the beam downwardly along a vertical axis parallel to the axis of ram reciprocation.

17. The combination punch press and laser cutting machine in accordance with claim 1 wherein said laser cutting head has a horizontally extending lower portion having said nozzle depending therefrom at its one end, a mirror disposed thereabove to direct the horizontally extending laser beam downwardly into said nozzle, a mirror spaced towards its other end to redirect the downwardly extending laser beam horizontally to said first mentioned mirror, and a lens to focus the laser beam.

18. The combination punch press and laser cutting machine in accordance with claim 17 wherein said horizontally extending lower portion is movable along a horizontal axis to bring said nozzle into alignment with said axis of reciprocation of said ram.

19. The combination punch press and laser cutting machine in accordance with claim 18 wherein there is connected to said horizontally extending portion at least one conduit for gas to be discharged through said nozzle.

20. The combination punch press and laser cutting machine in accordance with claim 19 wherein there is also connected to said horizontally extending portion a conduit for a fluid to cool the optics therein.

21. The combination punch press and laser cutting machine in accordance with claim 18 wherein said laser cutting head is supported on said head of said frame for movement between a position locating said nozzle coaxial with the axis of reciprocation of said ram and a position offset therefrom.

22. The combination punch press and laser cutting machine in accordance with claim 21 wherein there is included mounting and movement means mounting said cutting head on said head of said frame and providing said movement, said means providing rotation thereof about a vertical axis offset from said axis of reciprocation of said ram and movement along a vertical axis when said nozzle is in its position rotated from said ram axis.

23. The combination punch press and laser cutting machine in accordance with claim 21 wherein said ram assembly includes a punch mounting portion and said cutting head has a locating element thereon which seats in said punch mounting portion to locate said cutting head in precise coaxial alignment with said ram axis of reciprocation.

24. The combination punch press and laser cutting machine in accordance with claim 21 wherein there is included a control unit for automatically controlling the operation of said ram, activating said isolating means prior to operation of said ram, deactivating said isolating means to enable laser operation, operating said laser beam generator to generate a laser beam, and moving the workpiece relative to said workstation.

25. The combination punch press and laser cutting machine in accordance with claim 24 wherein said laser cutting head is supported on said frame for movement between a position locating said nozzle coaxial with the axis of reciprocation of said ram and a position offset therefrom, said movement being under control of said control unit.

26. A combination punch press and laser cutting machine comprising:
(a) a substantially rigid frame of generally C-shaped configuration with an elongated base, an elongated head extending in spaced relationship thereabove, and a vertically extending neck therebetween at the rearward end of the frame, said neck defining the vertical height of the open throat between the head and base, said frame having a platform extending rearwardly thereof;
(b) a ram assembly in said head adjacent its forward end for reciprocation of its ram relative to said base to punch workpieces disposed on said base, said axis of reciprocation defining the workstation;
(c) a laser cutting assembly mounted on said forward end of said head including a cutting head having a nozzle at its lower end, a lens for focusing the laser beam exiting said nozzle, and a mirror spaced above said nozzle for directing the laser beam through said nozzle;
(d) a laser beam generator on said platform and having an exit aperture adjacent one side of said frame;
(e) a laser beam transport assembly extending forwardly from said laser beam generator exit aperture along the side of said frame to said forward end of said head and including at the forward end thereof and a beam including redirection assembly to effect a redirection of the laser beam to said mirror of said cutting head;
(f) means supporting said laser cutting head on said head of said frame for movement between a position locating said nozzle coaxial with the axis of reciprocation of said ram and a position offset therefrom; and
(g) moving means for providing said movement of said between said positions, said means providing rotation of said head about a vertical axis offset from said axis of reciprocation of said ram and movement along a vertical axis when said nozzle is in a position rotated from said ram axis, said mounting means and movement means also effecting movement of said nozzle along a horizontal axis towards said ram axis of reciprocation 27. The combination punch press and laser cutting machine in accordance with claim 26 wherein said ram assembly includes a punch mounting portion and said cutting head has a locating element thereon which seats in said punch mounting portion to locate said nozzle in precise coaxial alignment with said ram axis of reciprocation.

28. The combination punch press and laser cutting machine in accordance with claim 26 wherein said beam redirection system has a mirror directing the laser beam upwardly and inwardly to a point forwardly of the axis of ram reciprocation, and a second mirror directing the beam downwardly along a vertical axis parallel to the axis of ram reciprocation.

29. The combination punch press and laser cutting machine in accordance with claim 26 wherein there is connected to said horizontally extending portion at least one conduit for gas to be discharged through said nozzle.

30. The combination punch press and laser cutting machine in accordance with claim 29 wherein there is also connected to said horizontally extending portion a conduit for a fluid to cool the optics therein.

31. The combination punch press and laser cutting machine in accordance with claim 26 wherein there is included isolating means between said laser beam generator and platform.

32. The combination punch press and laser cutting machine in accordance with claim 31 wherein there is included a computer control for automatically moving the workpiece on the base of said frame relative to said workstation, reciprocating the ram, operating said moving means to move the cutting head between said positions, activating the laser beam generator, and activating and deactivating said isolating means.

33. The combination punch press and laser cutting machine in accordance with claim 32 wherein there are connected to horizontal portion of said cutting head at least one conduit for gas to be discharged through said nozzle and a conduit for fluid to cool the optics therein, a supply of gas and fluid being under control of said computer control.

* * * * *

UNITED STATES PATENT AND TRADEMARK OFFICE
CERTIFICATE OF CORRECTION

PATENT NO. : 4,940,880
DATED : July 10, 1990
INVENTOR(S) : Hans Klingel et al It is certified that error appears in the above-identified patent and that said Letters Patent is hereby corrected as shown below:

Column 10, line 61, after "said", please insert
--head--.

Signed and Sealed this

Twenty-ninth Day of June, 1993

Attest:

MICHAEL K. KIRK

*Attesting Officer*     *Acting Commissioner of Patents and Trademarks*